Patented Nov. 7, 1933

1,934,123

UNITED STATES PATENT OFFICE 1,934,123

PROCESS FOR THE MANUFACTURE OF CONDENSATION PRODUCTS FROM DIOLEFINES AND HYDROCARBONS

Fritz Hofmann and Alfred Michael, Breslau, Germany, assignors to I. G. Farbenindustrie Aktiengesellschaft, Frankfort - on - the - Main, Germany, a corporation of Germany No Drawing. Application July 8, 1929, Serial No. 376,847, and in Germany July 12, 1928

13 Claims. (Cl. 260—168)

The present invention relates to a process of preparing condensation products from diolefines and hydrocarbons and to new products obtainable thereby.

In accordance with the present invention, diolefines containing the conjugate double linkage ... C:CH·CH:C ..., such as isoprene, butadiene, dimethylbutadiene and the like, can be condensed very readily with benzene hydrocarbons containing at least one alkyl group, including such hydrocarbons as contain in cyclic linkage attached to two carbon atoms in o-position of the benzene nucleus an aliphatic hydrocarbon chain of four members, for example, tolene, xylene, mesitylene and tetrahydronaphthalene. The reaction is performed by causing the two components to react with one another at a temperature above room temperature and under superatmospheric pressure in the presence of an alkali metal or a mixture of alkali metals for some time, say one to several hours.

The ratio of the two starting hydrocarbons may be varied within the widest limits, but generally we take care that they are present in about molecular quantities, the best results being obtained, when the ratio of the diolefine to the benzene hydrocarbon is about 1:3 to 1:4, since otherwise a large proportion of the diolefine is polymerized to rubber-like compounds due to the action of the alkali metal. The quantity of the alkali metal added to the reaction mixture is about 5 to 10% by weight calculated on the amount of the diolefine.

The process is generally carried out in an autoclave into which the two starting hydrocarbons and the required quantity of alkali metal are introduced. The autoclave is closed and the reaction mixture is heated to a temperature between about 80 and 200° C. and kept at this temperature for one to several hours, preferably while shaking the mixture. By heating the reaction mixture the pressure in the autoclave is raised, say to between about 5 and 20 atmospheres, depending on the specific temperature applied. When after about 1 hour or more the pressure in the autoclave decreases, the reaction is complete. The new condensation products are isolated from the reaction mixture by removing the alkali metal and distilling the mixture of the reaction products with steam. From the distillate the new condensation product is obtained by fractional distillation, whereby the unchanged starting material first distils over. The products thus obtainable are colorless to weakly colored high boiling liquids. They chemically represent unsaturated hydrocarbons in which according to our investigation the diolefine hydrocarbon has been attached to the alkyl-substituent of the benzene nucleus and which may be represented by the probable general formula:

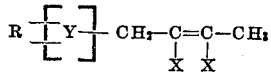

wherein R stands for a benzene nucleus which may be substituted by one to three alkyl groups, Y stands for a straight or branched saturated hydrocarbon chain attached to said benzene nucleus by a single bond or for a cyclic saturated hydrocarbon chain attached to two carbon atoms in ortho-position of said benzene nucleus, and X stands for hydrogen or methyl, being generally colorless to yellow colored high boiling liquids of characteristic odor.

The invention is illustrated by the following examples, but is not restricted thereto, the parts being by weight:

*Example 1.*—One part of butadiene and 3 to 4 parts of toluene are mixed while cooling and the mixture is heated to 80–90° C. for several hours in an autoclave, in which about 3 to 4% by weight of sodium metal are present (calculated on the butadiene-toluene mixture) in the form of wire of about 1 mm diameter. After completion of the reaction, during which the heat evolved is usually sufficient to cause the sodium metal to melt, the low viscous brown colored reaction mass is separated from the sodium metal and subjected to steam distillation, whereby the condensation product formed and any unchanged toluene distil over. A small amount of a rubber-like substance remains behind. The condensation product, 5-phenyl-pentene (2), is purified in an appropriate manner by fractionation and possesses a boiling point of 203–204° C. at ordinary pressure.

*Example 2.*—136 parts of isoprene, 500 parts of toluene and 10 parts of sodium metal are heated in an autoclave to about 160° C., while shaking. The pressure which has risen to 7 atmospheres slowly decreases to about 2 atmospheres within one hour, when the reaction is complete. After separating the sodium metal, the crude reaction mixture is distilled with steam and the distillate is fractionated. After distilling off unchanged toluene and isoprene the condensation product, 3-methyl-5-phenyl-pentene (2), or the isomeric 2-methyl-5-phenyl-pentene (2), respectively, is obtained as a yellowish colored liquid of the boiling point 218–222° C., having a pleasant odor. The yield is about 30% of the theoretical amount.

*Example 3.*—150 parts of 2.3-dimethylbutadiene, 500 parts of toluene and 6 parts of sodium metal are heated to 160° C. as described in Example 2. The reaction is complete, when the pressure has decreased from about 5 atmospheres to about 2 atmospheres. The reaction mass is worked up in the same manner as described in Example 2. There is obtained a yield of about 55% of the theoretical amount of 2.3-dimethyl-5-phenyl-pentene (2) as a liquid as clear as water, of the boiling point 235-238° C. and exerting an intense odor similar to geraniol.

*Example 4.*—130 parts of butadiene, 300 parts of tetrahydronaphthalene and 10 parts of sodium are heated in an autoclave to 160° C. as described in Example 2. The pressure decreases in a short time from 16 atmospheres to about 4 atmospheres, when the reaction is complete. The reaction product and unchanged tetrahydronaphthalene are separated by distillation in vacuo from a small quantity of a rubber-like substance and the distillate is fractionated under atmospheric pressure, whereby the butenyl-tetrahydronaphthalene having a boiling point of 270-272° C. is obtained as a yellowish colored liquid. Yield about 30% of the theoretical amount.

We claim:

1. The process which comprises reacting upon a diolefine containing a conjugate double linkage (C:CH·CH:C) with at least one equimolecular quantity of a benzene hydrocarbon containing at least one alkyl group in the presence of about 5 to 10% by weight (calculated on the amount of the diolefine) of an alkali metal at a temperature between about 80 and 200° C. and at a pressure of between about 5 and about 20 atmospheres.

2. The process which comprises reacting upon a diolefine containing a conjugate double linkage (C:CH·CH:C) with about three to four times the molecular quantity of a benzene hydrocarbon containing at least one alkyl group in the presence of an alkali metal at a temperature above room temperature and under superatmospheric pressure.

3. The process which comprises reacting upon a diolefine containing a conjugate double linkage (C:CH·CH:C) with three to four times the molecular quantity of a benzene hydrocarbon containing at least one alkyl group in the presence of about 5 to 10% by weight (calculated on the amount of the diolefine) of an alkali metal at a temperature between about 80 and 200° C. and at a pressure of between about 5 and about 20 atmospheres for about one to several hours.

4. The process which comprises reacting upon a diolefine containing a conjugate double linkage (C:CH·CH:C) with at least one equimolecular quantity of toluene in the presence of about 5 to 10% by weight (calculated on the amount of the diolefine) of sodium metal at a temperature between about 80 and 200° C. and at a pressure of between about 5 and about 20 atmospheres for one to several hours.

5. The process which comprises reacting upon a diolefine containing a conjugate double linkage (C:CH·CH:C) with three to four times the equimolecular quantity of toluene in the presence of about 5 to 10% by weight (calculated on the amount of the diolefine) of sodium metal at a temperature between about 80 and 200° C. and at a pressure of between about 5 and about 20 atmospheres for one to several hours.

6. The process which comprises reacting upon butadiene with at least one equimolecular quantity of toluene in the presence of about 5 to 10% by weight (calculated on the amount of the diolefine) of sodium metal at a temperature of between 150 and 160° C. in an autoclave for about 1 hour.

7. The process which comprises reacting upon butadiene with three to four times the equimolecular quantity of toluene in the presence of about 5 to 10% by weight (calculated on the amount of the diolefine) of sodium metal at a temperature of between 150 and 160° C. in an autoclave for about 1 hour.

8. As a new product 5-phenyl-pentene (2), being a colorless liquid boiling at about 203-204° C.

9. As a new product 2.3-dimethyl-5-phenyl-pentene-(2), being a colorless liquid boiling at about 235-238° C. and exerting an intense odor similar to geraniol.

10. As a new product butenyl-tetrahydronaphthalene, being a yellowish colored liquid boiling at about 270-272° C.

11. The process which comprises reacting upon a diolefine containing a conjugated double linkage with at least one equimolecular quantity of a compound selected from the group consisting of benzene hydrocarbons containing at least one alkyl group and benzene hydrocarbons containing in cyclic linkage attached to two adjacent carbon atoms of the benzene nucleus an aliphatic saturated hydrocarbon chain of four members, in the presence of an alkali metal at a temperature above room temperature and under superatmospheric pressure.

12. The products being obtainable in accordance with the process claimed in claim 11, being generally colorless to yellow colored high boiling liquids of characteristic odor.

13. The products being obtainable in accordance with the process claimed in claim 3, being generally colorless to yellow colored high boiling liquids of characteristic odor.

FRITZ HOFMANN. [L. S.]
ALFRED MICHAEL. [L. S.]